March 25, 1952     K. C. JENNE     2,590,415
CABLE MESSENGER CLAMPING BRACKET
Filed July 21, 1949     2 SHEETS—SHEET 1
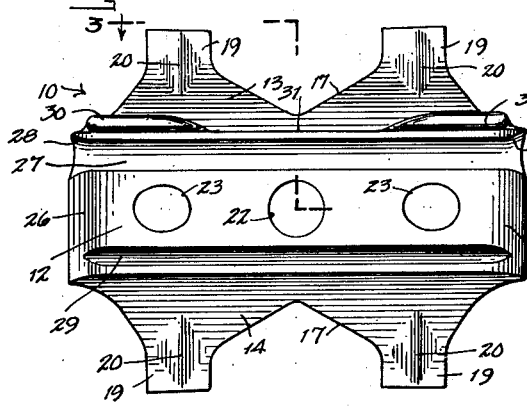
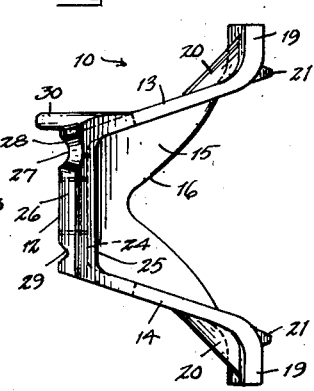
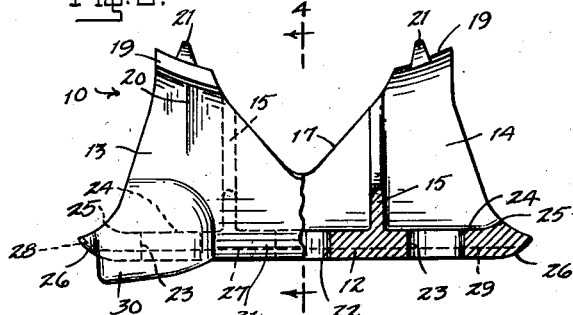
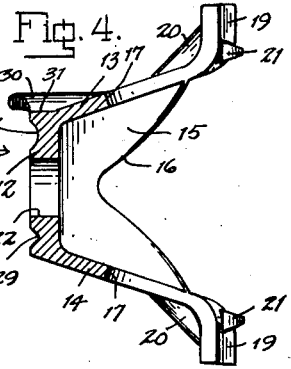
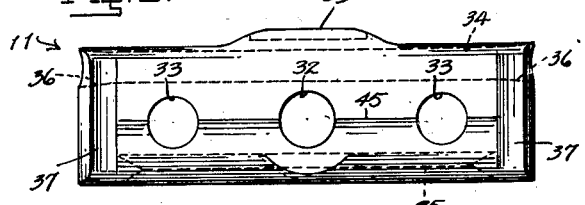
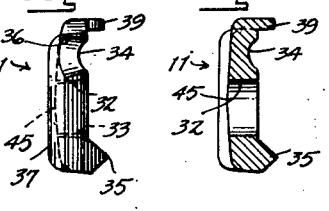
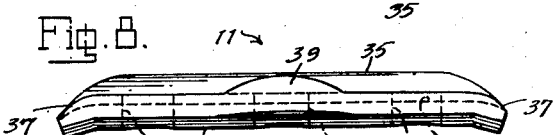
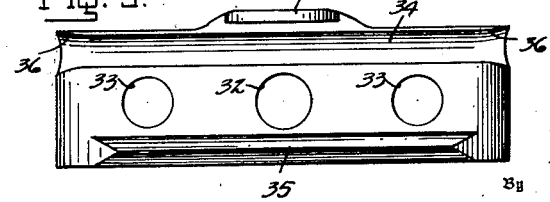
Inventor
KENNETH C. JENNE
By
Attorney March 25, 1952     K. C. JENNE     2,590,415
CABLE MESSENGER CLAMPING BRACKET
Filed July 21, 1949     2 SHEETS—SHEET 2
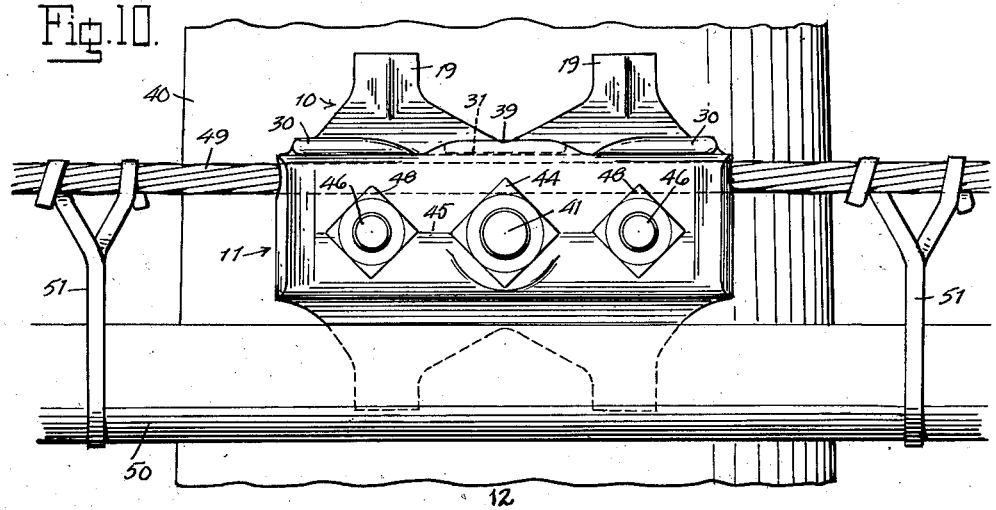
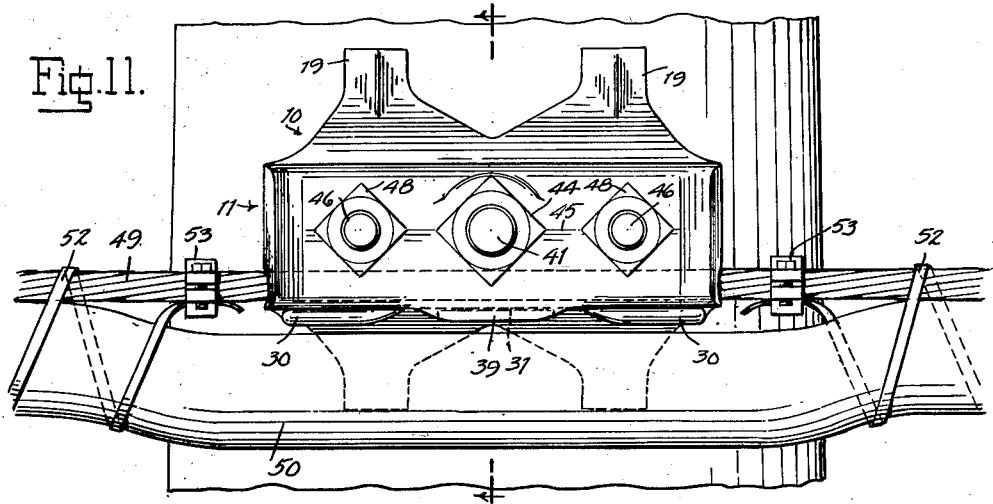
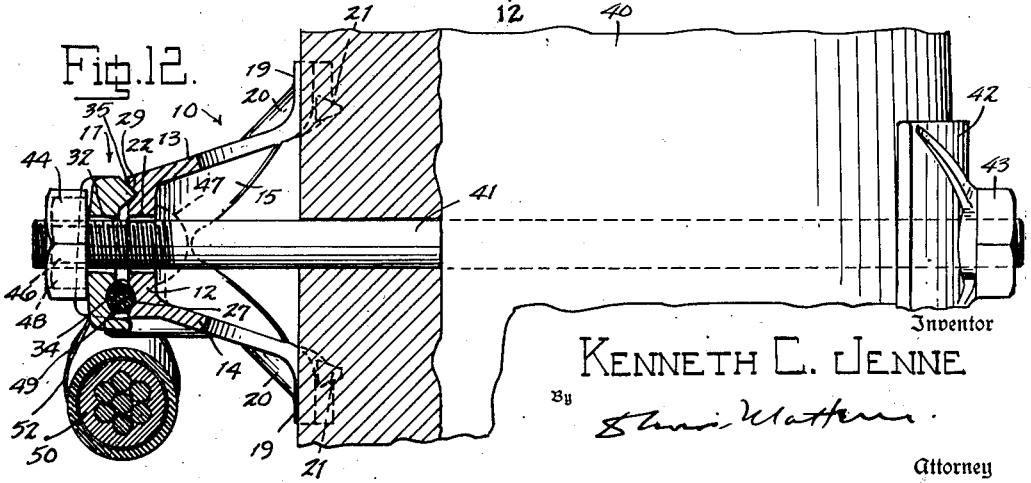
Inventor
KENNETH C. JENNE
By
Attorney Patented Mar. 25, 1952

2,590,415

UNITED STATES PATENT OFFICE 2,590,415

CABLE MESSENGER CLAMPING BRACKET

Kenneth C. Jenne, Branford, Conn., assignor to Malleable Iron Fittings Company, Branford, Conn., a corporation of Connecticut Application July 21, 1949, Serial No. 105,994

2 Claims. (Cl. 248—66)

The present invention relates to a cable messenger clamping bracket for attachment to transmission line poles, and constitutes an improvement over the clamping bracket disclosed in the U. S. Letters Patent to Roland G. Williams, 1,911,334 granted May 30, 1933. In this patent the clamp consists of a clamp body and a clamping plate adapted to be mounted on a pole by a through bolt and connected together independently of the through bolt by clamping bolts, the clamping plate having fulcrum engagement with the clamp body at one side of the bolts, and the two members having opposed grooves at the other side of the bolts in which the cable messenger is clamped.

In certain installations the conducting cables are supported in spaced relation to the cable messenger by supporting rings or hanger clips. In this type of installation there is sufficient space between the conducting cable and the cable messenger so that the cable messenger may be engaged in the clamp above the clamping bolts which may act as safety "links" to sustain the cable messenger when it is not tightly clamped in the clamping grooves, or may otherwise become disengaged therefrom. In other types, known as self-supporting cables, the conducting cable and the cable messenger are closely bound together by a metal binding tape or wire wound around them, and in this type of installation it is desirable to maintain the conducting cable relatively close to the cable messenger. In this case the clamping bracket may be inverted so that the clamping grooves are below the bolts, thereby permitting the cable messenger to remain close to the conducting cable without intervention of the bolts between them.

In the Williams patent the clamping plate is provided centrally of its edge adjacent the clamping groove with a projecting lip for engaging over the edge of the body member. When the bracket is used in inverted position, that is with the clamping grooves below the bolts, this central lip serves to retain the cable in the clamping grooves, particularly when the clamping bolts are loosened to permit the cable messenger to slip freely through the grooves during stringing of the cable. However, this structure des not effectually prevent the cable messenger from wedging in the spaces between the body and the clamping plate at each side of the lip, which might occur either when the clamping bolts are intentionally loosened, or when an excessive strain or weight is placed on the cable messenger, as for instance when the cable is coated with ice.

It is proposed according to the present invention to provide projecting lip means upon the clamp body in relation to the end portions of the clamping grooves at each side of the centrally disposed projecting lip of the clamping plate. Thus when the cable messenger is below the bolts, safety "links" are present in the form of three projections on the bracket—one on the clamping plate and two on the clamping body. It is further proposed to provide the projections of the clamp body with end abutment shoulders disposed substantially straight across the space between the plate and body to eliminate the possibility of the messenger cable wedging itself between the plate and the body.

A further object is to provide a clamping bracket in which both the body and plate are belled at the ends to permit turns in the cable messenger up to 45° at either end, the radius of the grooves in the belled end portions being such as to give full support and bearing to the cable messenger through the full sweep of the turn.

Another object is to provide the clamp body with spurred pole engaging means so arranged as to minimize any tendency to overturn or slot down the pole.

With the above and other objects in view, an embodiment of the invention is shown in the accompanying drawing, and this embodiment will be hereinafter more fully described with reference thereto, and the invention will be finally pointed out in the claims.

In the drawings:

Fig. 1 is a front elevation of the body member of the clamping bracket, according to the illustrated exemplary embodiment of the invention.

Fig. 2 is an end elevation, as seen from the right in Fig. 1.

Fig. 3 is a view partially in plan view and partially in horizontal section, taken along the line 3—3 of Fig. 1.

Fig. 4 is a vertical sectional view, taken along the line 4—4 of Fig. 3.

Fig. 5 is a front elevation of the plate member.

Fig. 6 is an end elevation, as seen from the right in Fig. 5.

Fig. 7 is a vertical sectional view, taken along the line 7—7 of Fig. 5.

Fig. 8 is a top plan view.

Fig. 9 is a rear elevation.

Fig. 10 is a front elevation of the complete clamp mounted upon a pole and showing the cable messenger clamped above the clamping bolts.

Fig. 11 is a similar view showing the clamping bracket in inverted position with the cable messenger clamped below the clamping bolts.

Fig. 12 is a vertical sectional view taken along the line 12—12 of Fig. 11.

Similar reference characters indicate corresponding parts throughout the several figures of the drawings.

Referring to the drawings, the cable messenger clamp for attachment to transmission line poles, according to the illustrated exemplary embodiment of the invention shown therein, comprises a pole-engaging clamp body 10, shown in detail in Figs. 1 to 4, and a clamping plate 11, shown in detail in Figs. 5 to 9, for clamping connection to the clamp body by means of bolts, as will presently more fully appear. The clamp body and clamping plate are preferably in the form of malleable iron castings although it will be understood that the invention is not limited to this type of structure and material.

The clamp body 10 is provided with a forwardly disposed longitudinally extending face portion 12 of generally rectangular form, adapted to be outwardly spaced from the pole from which the bracket is supported by upper and lower rearwardly extending diverging flanges 13 and 14 having a pair of longitudinally spaced vertically disposed reinforcing webs 15—15 integrally connected between the inner surfaces of the face portions, each preferably having a V-shaped contour 16 at its inner edge for the purpose of reducing the weight of material while still providing structural support. Each of the flanges is provided at its central portion with a V-shape contour 17 and is rearwardly and outwardly inclined at its end edges, as at 18, thus providing two converging leg portions at the inner ends of which there are provided foot portions or pads 19, which as shown in Fig. 13 are disposed along an arcuate line so that they will substantially conform to the surface of the pole with which the clamp body is engaged. Reinforcing web formations 20 extend diagonally across the corners formed by the outer surfaces of the flanges and the pads 19. At the inner side of each of the pads 19 there is provided a projecting spur 21 adapted when the clamp body is engaged with the wood pole to dig into the wood to minimize any tendency to overturn or slot down on the pole.

The spaced bearing surfaces provided by the pads 19 and the spurs 21 are substantially pole conforming, so that when the bracket is bolted to the pole its horizontal position will be maintained and tilting due to uneven strain at one or the other side will be effectually resisted. The clamp body is of substantially symmetrical form at each side of its horizontal center line, so that it may be mounted upon the pole with equal facility and with the same degree of supporting strength, either with the messenger cable above the clamping bolts, or in inverted position with the messenger cable below the clamping bolts.

The face portion 12 of the clamp body is provided with a central hole 22 for receiving the pole mounting through bolt of the bracket, and at each side thereof with longitudinally aligned oval holes 23—23 for receiving clamping bolts, these latter being oval neck track bolts. The holes 23 are disposed substantially centrally between the respective web portions 15 and the ends of the face portion, so that the inner side of the face portion provides pockets 24 for the heads of the clamping bolts engaged in the holes 23, the outer ends of the pockets being formed by end ribs 25—25 provided upon the rearward side of the face portion 12. The forward side of the face portion has a convex radius 26 at each of its ends.

A cable messenger receiving longitudinal groove 27 is provided in the face portion along its upper edge in spaced relation above the bolt holes 22 and 23, its end portions being belled, as at 28. Adjacent the lower edge of the face portion 12, in spaced relation below the bolts 22 and 23, there is provided a longitudinally extending V-shaped groove 29 for receiving a fulcrum portion of the clamping plate, as will presently more fully appear.

Adjacent the ends of the upper edge of the face portion 12, and formed as integral enlargements of the flange portion 18, there are provided forwardly projecting lips 30—30 adapted for cooperative engagement with the upper edge of the clamping plate, a flat bearing surface 31 extending longitudinally between the lips 30 for engagement by a cooperating lip provided upon the clamping plate, as will presently more fully appear. Each of the lips 30 has a transversely disposed end disposed substantially in line with the top line of the radius end surface 26.

The clamping plate 11 is of generally rectangular form, substantially corresponding in its length and width dimensions to the face portion 12 of the clamp body. A central bolt-receiving hole 32 is provided for register with the hole 22 of the clamp body, and bolt-receiving holes 33—33 are provided in longitudinally spaced relation at each side thereof for register with the holes 23—23 of the clamp body. Upon the inner surface of the clamping plate adjacent its upper edge there is provided a longitudinally extending cable messenger receiving groove 34, which in the operative relation of the parts is opposed and complementary to the groove 28 of the clamp body, and adjacent the lower edge there is provided a longitudinally extending V-shaped rib 35 adapted to have fulcrum engagement in the V-groove 29 of the clamp body. The end portions of the groove 34 are belled, as at 36, and the end portions of the clamping plate are flared, as at 37, so that in the engaged relation of the clamping plate with the clamp body flared spaces are provided at each end so that the cable messenger may be angled in different directions. Centrally of the upper edge of the clamping body there is provided an inwardly projecting lip 39 adapted in the assembled relation to engage upon the bearing surface 31 of the clamp body between the projecting lips 30—30 which engage the upper edge of the clamping plate at each side of the lip 39.

The clamping bracket is mounted upon the pole 40, as shown in Figs. 10 to 12, by a through bolt 41 extended through the pole having one threaded end engaged through a pole engaging washer 42 and secured by nut 43, while its other threaded end is engaged through the hole 22 of the clamp body and the hole 32 of the clamping plate and secured by a nut 44 bearing upon the outer surface of the clamping plate. This outer surface is preferably slightly arched so that a ridge 45 extends along the longitudinal center line of the bolt holes, thus providing firm contact with the center of the nut in different positions of angular adjustment of the clamping plate with respect to the clamp body. The clamping plate is bolted to the clamp body by oval necked track bolts 46 non-rotatably engaged in the oval holes 23 of the clamp body and projected through the holes 33 of the clamping plate, the bolt heads 47 engaging the pocket bearing surfaces 24 of the clamp body and the nuts 48 engaging the ridge surface 45 of the clamping plate.

As shown in Fig. 10 the clamping bracket is applied to the pole with the cable messenger receiving grooves disposed at the upper side of the bolts. The cable messenger 49 which is clamped in the grooves 27 and 34 supports the conductor cable 50 at a substantially spaced distance below it upon hanger clips 51. As shown in Fig. 11 the clamping bracket is inverted, so that the cable messenger grooves are at the underside of the bolts, and in this case the cable messenger 49 closely supports the conductor cable 50 by metal lashing tape or wire 52 wound about them, this tape or wire being cut and its ends secured at each side of the clamped section by clamps 53 so that the cable messenger may be engaged within the grooves, the conducting cable being spaced below the cable messenger only a sufficient distance to allow the interposition of the lips 30 and 39 of the clamp body and clamping plate.

In operation, the clamping bracket is mounted upon the pole 40 with the clamping grooves 27 and 34 either above the bolts, as shown in Fig. 10, or below the bolts, as shown in Fig. 11, depending upon whether the installation requires that the cable messenger be relatively widely spaced from the conductor cable and supported by clips, or the like, or be relatively close to the conductor cable and supported by a lashing wire or the like. In either case the clamping plate may be loosened to permit engagement of the cable messenger by backing off the nuts of the through bolt and the clamping bolts. When the cable messenger is above the bolts, safety "links" are provided by the through bolt and the clamping bolt to prevent dropping of the cable messenger before it is clamped in the grooves and at the same time the projecting lips 30 will prevent upward disengagement. When the cable messenger is below the bolts safety "links" are present in the form of the three projections on the clamp, that is the central lip 39 of the clamping plate, and the two lips 30 of the clamp body. The nuts on the clamping bolts must be well backed off before the cable messenger can come out or be taken out of the groove, so that a relatively large size cable messenger may be loosely supported during the installation without danger of dropping. When the clamp is tightened the lips 30 provide a ledge beneath the cable messenger to prevent its disengagement from the clamp through unusual strains such as a dead weight imposed thereon by a coating of ice. In addition, the transversely disposed outer edges of the lips 30 eliminate the possibility of the cable messenger wedging itself between the clamping plate and the clamp body, and this condition will be realized even in the case of a relatively large diameter cable messenger.

In this connection the clamping bracket will effectually support a relatively wide range of cable messenger diameters, for instance a given size bracket may accommodate cable messengers having a diameter range between $\frac{5}{16}''$ and $\frac{1}{2}''$. In the case of the $\frac{1}{2}''$ diameter cable messenger the lips 30 will be spaced below the grooves a sufficient distance so that, when the cable messenger is centered in the grooves, it will be out of contact with the lips and will therefore not become displaced from its centered position. The lateral projection of the lips is such that, under conditions of loosening of the clamping bracket, or the like, with the cable messenger dropped to a point where it is engaged in the space between the outer edges of the clamping grooves adjacent the lips, the edges of the lips will be at least in line with and preferably beyond the dead center of the cable messenger, so that the latter will be effectually prevented from becoming wedged between the clamping plate and the clamp body. The lips 30 act as a shelf to positively support the cable messenger when the bolts are intentionally loosened, as well as when the bolts become unintentionally loosened or the clamping bracket becomes distorted through excessive strain or other causes. By providing the lips 30 on the clamp body strain thereon is taken by the clamp body without direct strain on the clamping bolts 46, which might cause them to bend. The provision of the central lip 39 on the clamping plate extending in opposite direction to the lips 30 enables maximum opening of the clamp while still providing support for the cable.

While the clamping bracket is shown as particularly adapted for support upon a wood pole it will be understood that it may be readily adapted for mounting upon metal poles, flat surfaces and other suitable supports.

I have illustrated and described a preferred and satisfactory embodiment of the invention, but it will be understood that changes may be made therein, within the spirit and scope thereof, as defined in the appended claims.

What is claimed is:

1. A reversible clamping bracket for attachment to a transmission line pole or like support comprising a clamp body having a support engaging rearward side and a cable clamping forward side, a clamping plate engaged with the forward side of said clamp body, clamping bolt means connecting said clamp body and said clamping plate, said clamp body and said clamping plate being provided in vertically spaced relation at one side of said bolt means with complementary longitudinal cable receiving grooves in their opposed surfaces, fulcrum means in vertically spaced relation at the other side of said bolt means cooperatively arranged between said clamp body and said clamping plate whereby said grooves are movable toward and away from each other, a projecting lip carried by said clamping plate adjacent the outer edge of its cable receiving groove substantially centrally between the outer ends of said groove and in the clamped position of said clamping plate extending over the edge of said clamp body adjacent the outer edge of its cable receiving groove, and a pair of projecting lips carried by said clamp body adjacent the outer edge of its cable receiving groove disposed at each side of said lip of said clamping plate and substantially adjacent to the ends of said groove, said pair of lips in the clamped position of said clamping plate extending over the edge of said clamping plate adjacent the outer edge of its cable receiving groove, said bolt means providing a cable retaining barrier below the clamped cable in the position of said bracket with the cable above the bolt means and said pair of lips providing a cable retaining barrier below the clamped cable in the reversed position of said bracket with the cable below the bolt means.

2. A reversible clamping bracket, for attachment to a transmission line pole or like support, comprising a clamp body having a support engaging rearward side and a cable clamping forward side, a clamping plate engaged with the forward side of said clamp body, a pair of longitudinally aligned clamping bolts connecting said clamp body and said clamping plate respectively positioned contiguous to the ends of said body member, said clamp body and said clamping plate being provided in vertically spaced relation at one side of said bolts with complementary longitudinal cable receiving grooves in their opposed surfaces, fulcrum means in vertically spaced relation at the other side of said bolts cooperatively arranged between said clamp body and said clamping plate whereby said grooves are movable toward and away from each other, a projecting lip carried by said clamping plate adjacent the outer edge of its cable receiving groove substantially centrally between the outer ends of said groove and in the clamped position of said clamping plate extending over the edge of said clamp body adjacent the outer edge of its cable receiving groove, and a pair of projecting lips carried by said clamp body adjacent the outer edge of its cable receiving groove respectively in vertically opposed relation to said clamping bolts and respectively disposed substantially adjacent to the ends of said groove, said pair of lips in the clamped position of said clamping plate extending over the edge of said clamping plate adjacent the outer edge of its cable receiving groove, said bolts providing a cable retaining barrier below the clamped cable in the position of said bracket with the cable above the bolts and said pair of lips providing a cable retaining barrier below the clamped cable in the reversed position of said bracket with the cable below the bolts.

KENNETH C. JENNE.

REFERENCES CITED

The following references are of record in the file of this patent:

UNITED STATES PATENTS

| Number | Name | Date |
|---|---|---|
| 1,798,223 | Richardson | Mar. 31, 1931 |
| 1,911,334 | Williams | May 30, 1933 |
| 2,025,717 | Blackburn | Dec. 31, 1935 |
| 2,334,560 | Kennedy | Nov. 16, 1943 |